(12) United States Patent
Linde et al.

(10) Patent No.: US 7,577,578 B2
(45) Date of Patent: Aug. 18, 2009

(54) METHOD FOR DETERMINING THE POST-LAUNCH PERFORMANCE OF A PRODUCT ON A MARKET

(75) Inventors: Viveka Linde, Västra Frölunda (SE); Mats Linde, Västra Frölunda (SE)

(73) Assignee: IMS Software Services Ltd., Plymouth Meeting, PA (US)

( * ) Notice: Subject to any disclaimer, the term of this patent is extended or adjusted under 35 U.S.C. 154(b) by 1064 days.

(21) Appl. No.: 10/006,600

(22) Filed: Dec. 5, 2001

(65) Prior Publication Data

US 2003/0105773 A1    Jun. 5, 2003

(51) Int. Cl.
*G06F 17/30* (2006.01)
(52) U.S. Cl. ............................................. 705/10
(58) Field of Classification Search ............ 705/10, 705/7
See application file for complete search history.

(56) References Cited

U.S. PATENT DOCUMENTS

| | | | | |
|---|---|---|---|---|
| 5,285,494 | A * | 2/1994 | Sprecher et al. | 455/423 |
| 5,890,156 | A * | 3/1999 | Rekieta et al. | 707/10 |
| 5,930,764 | A * | 7/1999 | Melchione et al. | 705/10 |
| 5,966,695 | A * | 10/1999 | Melchione et al. | 705/10 |
| 5,991,751 | A * | 11/1999 | Rivette et al. | 707/1 |
| 6,078,924 | A * | 6/2000 | Ainsbury et al. | 707/101 |
| 6,101,749 | A * | 8/2000 | Inbar et al. | 40/361 |
| 6,321,205 | B1 * | 11/2001 | Eder | 705/7 |
| 6,408,263 | B1 * | 6/2002 | Summers | 703/6 |
| 6,434,533 | B1 * | 8/2002 | Fitzgerald | 705/10 |
| 6,523,027 | B1 * | 2/2003 | Underwood | 707/4 |
| 6,584,472 | B2 * | 6/2003 | Classen | 707/104.1 |
| 6,704,740 | B1 * | 3/2004 | Lang | 707/102 |
| 6,704,873 | B1 * | 3/2004 | Underwood | 713/201 |
| 6,708,156 | B1 * | 3/2004 | Gonten | 705/10 |
| 6,735,399 | B2 * | 5/2004 | Tabb et al. | 399/8 |
| 6,782,370 | B1 * | 8/2004 | Stack | 705/10 |
| 6,792,412 | B1 * | 9/2004 | Sullivan et al. | 706/25 |
| 6,873,979 | B2 * | 3/2005 | Fishman et al. | 706/21 |
| 6,934,687 | B1 * | 8/2005 | Papierniak et al. | 705/10 |
| 7,016,882 | B2 * | 3/2006 | Afeyan et al. | 706/13 |
| 7,092,896 | B2 * | 8/2006 | Delurgio et al. | 705/10 |

OTHER PUBLICATIONS

PR Newswire, "CUNO Posts Record Results," New York, Dec. 11, 1997, p. 1 (seven pages total).*
Business World, "Fighting to stay on top," Manila, Dec. 11, 1996, p. 25 (four pages total).*

* cited by examiner

*Primary Examiner*—Andrew Joseph Rudy
(74) *Attorney, Agent, or Firm*—Baker Botts LLP

(57) ABSTRACT

A method for determining the post-launch performance of a product on a market is provided. The method involves storing, in a database, collected data related to at least one key success factor associated with at least the market performance which is related to said product; storing, in a database, collected data related to unmet needs on said market; storing, in a database, collected data related to the propensity of a decision-maker to choose said product; and using a computer to calculate the future market share of said product based on said collected data, thereby determining said post-launch performance on said market. The method allows improved forecasting of the future performance of a product on a market and provides improved understanding, benchmarking, forecasting and strategic decision-making as regards the future sales of the product in question.

3 Claims, 5 Drawing Sheets

Fig. 6

$\square \times \square \times \square \times \square \times \square \times \square = \square$ 17  18  19  20  21  22  23

$\square \times \square \times \square \times \square \times \square \times \square = \square$

24

$\square \times \square \times \square \times \square \times \square \times \square = \square$

25

$\Sigma \square$

26

METHOD FOR DETERMINING THE POST-LAUNCH PERFORMANCE OF A PRODUCT ON A MARKET

TECHNICAL FIELD

The invention relates to a method for determining the post-launch performance of a product on a market.

The invention also relates to a computer system for determining the post-launch performance of a product on a market.

BACKGROUND OF THE INVENTION

In many fields of trade and industry, there is a general need for systems and methods for monitoring and evaluating the performance of a product or a service on a market, in particular for estimating the expected future sales of such a product or service. In this manner, information as regards market trends, marketing impact and competition can be used. By using such information in a suitable manner, the sale of the product or service in question can be expected to be improved.

One such field of trade is the medical industry, in which there is a need to monitor and evaluate the marketing situation and market performance of various medical drugs related to different diseases. As suggested above, the obtained information can then be used to improve the sale of the drugs in question.

For example, when a pharmaceutical company intends to launch a new medical drug, the company will normally be interested in determining the conditions under which the marketing of the agent will gain the highest market shares and number of patients using the drug in the relevant markets. In this manner, the likelihood of a successful launching of the drug in question can be increased.

To a great extent, the market for drugs is constituted by physicians issuing prescriptions of drugs to patients. This means that a high degree of marketing efforts and advertising are invested in a manner so as to influence the physicians to adopt, select and prescribe a particular brand of a drug.

The process in which a physician gradually obtains an interest for a drug—from an initial stage in which the physician becomes aware of the drug until a final stage in which the particular drug has become the physician's first rated drug, or "drug of choice"—can be referred to as the "adoption" of the drug in question. If a physician has fully "adopted" a particular drug, it can be expected that the sales of that drug will be improved.

There are existing ways of providing information of the market performance of particular drugs, by collecting information related to prescriptions issued by a number of physicians during a particular time period. Although such a known method would provide information as to the actual market position of a particular drug, it will not provide the reasons behind the selection process which the physicians undergo when deciding which (of several) drugs to prescribe against a certain given disease.

Furthermore, there is a demand for improved ways of forecasting changes in sales and to estimate and present information related to the present market performance of a product or service. In order to obtain accurate information regarding the marketing situation related to a drug (or, in fact, any other product), it is of importance to provide means for collecting, transmitting and presenting data related to, for example, the adoption of the drug, for quick and easy understanding and treatment of such data by the respective end user. In particular, it is known that a significant part of a brand's marketshare is constituted by so-called repeat sales, i.e. the case in which a customer repeatedly purchases the same brand, while changes in the total market and/or a brand's share of the market might emanate from consumers entering or leaving the market or switching between brands.

It can thus be noted that it is desirable for companies to monitor and process information as regards the market situation for a particular product in a more effective manner. In particular, there is a desire for obtaining information related to a pre-launch strategy of a product, in terms of complete and correct pre-launch decisions, in order to determine the post-launch performance of the product on its relevant markets. In this manner, the post-launch performance and consequently also the success of the product can be expected to be optimised.

When a company intends to launch a product, a number of decisions have to be taken. For example, it should be determined which so-called "unique selling point" is the most relevant for the product. In this regard, its efficacy, mode of action or side effect profile can for example be taken into account. Furthermore, it should be determined which are the most important unmet needs of the market, as regards the efficacy of existing drugs on the market. Other conceptual options (for example efficacy, faster onset of action, better side effect profile etc.) for the product should also be considered. Also, the relevant market target group (specialists or general practitioners) should be determined, as well as the price level of the product to be launched. In summary, the total number of possible decision combinations which influence the post-launch success of the product can be substantial, which means that it is difficult to take the correct decisions for a product launch. In particular, there is difficulty in determining which combination of decisions will render the highest number of patients for the product, i.e. the highest impact on the relevant markets.

SUMMARY OF THE INVENTION

A primary object of the invention is to provide a method for determining the post-launch performance of a product on a market, i.e. to estimate the future market performance related to said product.

This object is accomplished by means of a method according to subsequent claim 1, i.e. a method for determining the post-launch performance of a product on a market, comprising: storing, in a database, collected data related to at least one key success factor associated with at least the market performance which is related to said product; storing, in a database, collected data related to unmet needs on said market; storing, in a database, collected data related to the propensity of a decision-maker to choose said product; and calculating the future market share of said product based on said collected data, thereby determining said post-launch performance on said market.

This object is also accomplished by means of a computer system according to subsequent claim 4, i.e. a system for determining the post-launch performance of a product on a market, comprising a database for storing collected data related to at least one key success factor associated with at least the market performance which is related to said product, for storing collected data related to unmet needs on said market and for storing collected data related to the propensity of a decision-maker to choose said product, and a central computer unit adapted for calculating the future market share of said product based on said collected data, thereby determining said post-launch performance on said market.

By means of the invention, a number of advantages will be obtained. Firstly, it can be noted that the present invention constitutes a basis for providing a pre-launch strategy for forecasting the future, post-launch performance in terms of sales of the product or service in question.

According to the invention, a number of key "success factors", which will be described below, are used. These key success factors provide transparency of a market for fast understanding, benchmarking, forecasting and strategic decision-making and are crucial for the expected future sales of the product in question.

Furthermore, the invention constitutes a user-friendly system due to the fact that a user, by accessing a particular database, may choose a number of parameters which are related to the product in question (for example a particular latent need of an existing, competing drug on the relevant market). By means of stored information, the future, post-launch success of the product in question can be estimated and quantified prior to launch of the product based on the chosen parameters and the related market decisions. The resulting information is then easily available for the user and provides a quantification of the post-launch success.

BRIEF DESCRIPTION OF THE DRAWINGS

The invention will now be described in more detail for explanatory, and in no sense limiting, purposes, with reference to the figures described hereafter.

PREFERRED EMBODIMENT

Figure 1:
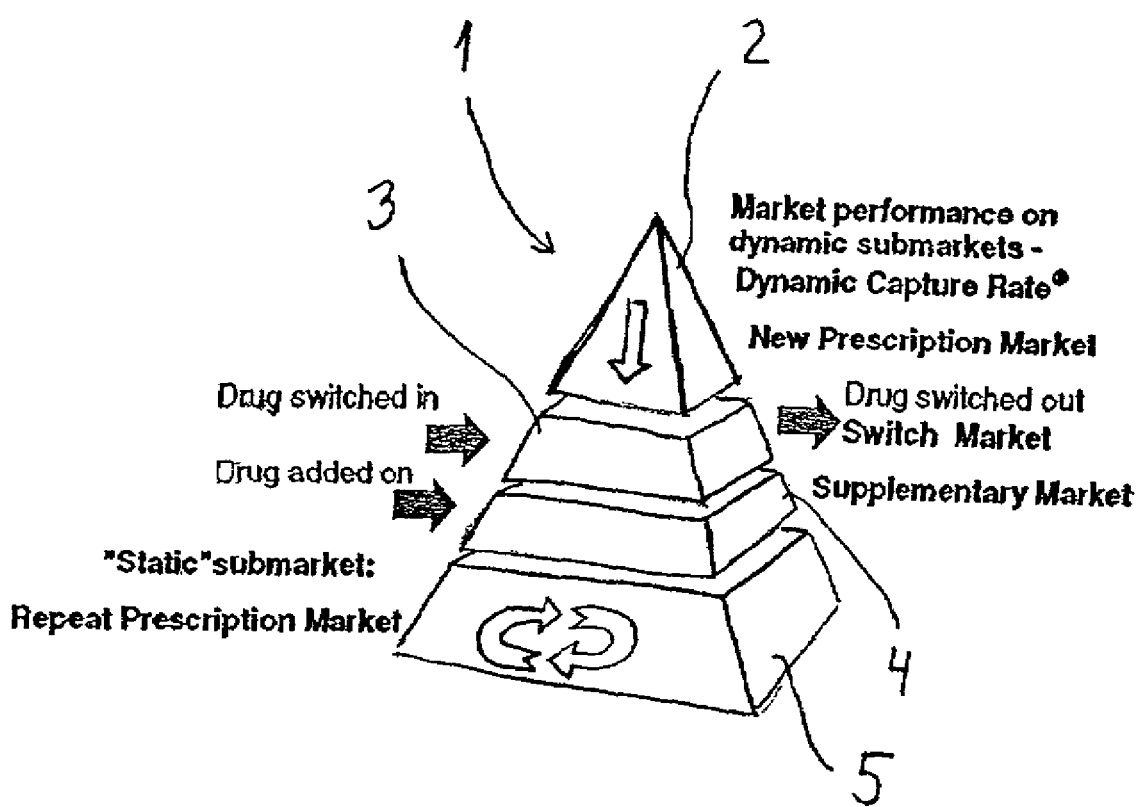
FIG. 1 shows schematically how the total market for a product such as a medical drug is divided into different sub-markets.

The invention relates to a method and a system for processing and presenting information related to a pre-launch evaluation of the post-launch performance of a product on a market, i.e. the likelihood of success of the product after launch on its markets. The performance of the product on the future market can consequently be estimated.

As will be described in detail below, the invention is particularly, but not exclusively, adapted for processing and presenting information related to medical drugs. However, the invention is equally well suited for any other product or service. In this regard, the term "product" which is used in this application is consequently used to indicate any form of article, goods, services or product which can be commercially available on a market.

Consequently, any form of business, in the form of a manufacturer, research centre, marketing agency, department store or similar enterprise, may use the invention in a suitable manner in order to obtain information related to the post-launch success of a particular product. In this manner, the invention can be used in order to meet certain desired business objectives including incremental sales and obtaining increased market shares for the product.

Furthermore, the invention can also be used in order to meet certain objectives as regards the manner in which the information in question is gathered, stored, transmitted and presented. The hardware and software components used for the invention comprises software components executing on various hardware machines. This will be described in greater detail below.

In order to provide information so that the correct decisions are taken, which in turn will provide a correct evaluation of the post-launch performance of a drug for a particular illness, the invention is based on the treatment of information related to the following issues. Firstly, the invention is based on the fact that a knowledge and an understanding of the relevant market is provided. This will be described in detail below with reference to a number of "key success factors". Secondly, the invention is based on information of the market's unmet needs as regards known drugs related to the illness in question. This can be done by carrying out an evaluation of the current available treatments which constitute alternatives to the drug in question and which can be used to calculate potential market shares for the drug. Thirdly, the likelihood of the drug to satisfy those unmet needs can be determined by quantifying the propensity of physicians to prescribe the drug as an alternative to defined competitors.

Finally, by combining estimations related to the three above-mentioned issues (i.e. the "key success factors", the unmet needs and the propensity to prescribe), the post-launch performance of the drug can be quantified. This means that the different conceptual options can be evaluated, in particular with respect to the estimated post-launch market shares and number of patients for each of said conceptual options.

Preferably, numerical values representing the three above-mentioned issues form the basis of calculations which also take other factors into account. For example, the proportion of patients which are available for treatment with the drug in question is taken into account. Also, the size of the relevant market and the number of patients available for the drug are also considered during the calculations.

For the purpose of understanding the present invention, a number of key "success factors" for obtaining improved market performance of a product, such as a medical drug, will now be described. The invention relies on the insight that such key success factors are crucial for the expected future sales of the product in question, and also for the possibilities of processing, presenting and transmitting relevant information regarding the market situation of a drug and for the quantification of the post-launch performance.

This set of information is normally provided by a service provider such as a medical marketing company, and is supplied, in accordance with the invention, to a client which normally is in the form of a medical company, a drug manufacturer, a research center or a similar enterprise.

It can be noted that the key success factors provide transparency of a market for fast understanding, benchmarking, forecasting and strategic decision-making. By means of the key success factors, the structure, dynamics and trends on a particular market for a particular drug and/or disease can be studied and analyzed. As will be described in greater detail below, the result of such a process can then easily be stored for subsequent transmission to a client.

A number of key success factors will now be presented. One such key success factor is the so-called "detailing rate" of a particular drug. The detailing rate is a measure or parameter which corresponds to the proportion of physicians (from a group) spontaneously recalling detailing activities related to a drug. Such detailing activities may for example consist of personal promotion visit from a pharmaceutical representative or a similar detailing activity. The detailing rate consequently provides information related to the marketing of a particular drug. In order to be successful in marketing, it is important to reach out to a sufficiently high proportion of physicians with detailing. Consequently, it is desired to obtain a high detailing rate for a particular drug.

Another key success factor is the so-called "adoption rate", which is a measure which indicates how well a drug is adopted by a physician. The adoption rate consequently provides a measure the amount of which indicates to what degree a physician gradually adopts the drug, from a first stage with an initial first knowledge of the drug until a final stage, in which the drug constitutes the first choice (against a particular disease) for the physician. Consequently, the adoption rate provides important knowledge of the physician's emotional process during the adoption process of a drug and can be used for initiating various marketing activities. In particular, it provides a method by means of which the market adoption of different brands can be quickly and easily compared.

A further key success factor is the so-called "capture rate", which is a measure which indicates and summarises the present market performance of a drug. The capture rate reflects the total ability of a product to capture market shares, reflecting the impact from market and marketing influences and forecasting changes in future sales. Consequently, it can be said that the capture rate of a drug is an indication of the competitive strength of the drug, or the drug's present market performance.

In order to fully describe the capture rate of a drug, the concept of dynamic and static market segments will now be described with reference to FIG. 1. The total market for a particular product—which is indicated by reference numeral 1 in FIG. 1—can be schematically described as a pyramid, which in turn is sub-divided into several segments. More precisely, the total market 1 can be subdivided into so-called dynamic and static market market segments. In this regard, the term "dynamic submarkets" is used to describe the segments which actively change in response to external market influences. An example of such a dynamic submarket is the "new prescription market" 2, which illustrates which brands are used for the initial treatment of patients, and their relative market positions.

Another kind of dynamic submarket is the "switch market" 3, which shows brands of drugs switched in and switched out when a physician changes the prescribed drug during the treatment of an disease. A further type is the "supplementary market" 4, which illustrates which brands of drugs are added on to basic therapy.

In contrast to the dynamic markets, the so-called "repeat prescription market" 5 is a static market which is relatively stagnant and merely reflect (or result from) previous changes on the dynamic submarkets (although repeat sales often account for the bulk of total sales). The repeat prescription market 5 shows which brands are repeat prescribed. The repeat prescription market 5 is not static in the long run, but changes on this market are only the result of the dynamics on the new prescription market 2, the switch market 3 and the supplementary market 4. The results of previous marketing efforts are accumulated on the repeat prescription market 5 and it is on this market that the large prescription/sales volumes are acquired for chronic disorders.

In all chronic disorders a large part of sales emanate from repeat prescriptions—which is a consequence of yesterday's marketing efforts—and may thus camouflage what is happening in the dynamic market segments.

In can be noted that a good position on the repeat prescription market 5 is often the result of a good position on the new prescription market 2. Also, losing on the switch market 3 may be the first sign of losing future repeat prescription market 5 shares.

For the purpose of the present invention, it can be assumed that the new prescription market, the switch market and the supplementary market constitutute the dynamic market segments which offer the highest possibility of capturing new patients and new market shares. The purpose of the invention is therefore related to quantifying the post-launch success on these three market segments.

The aim of marketing is to influence and increase the prescription rate of a drug, i.e. which leads to sales. As such, marketing needs to influence market performance by affecting the ability of the drug in question to capture new patients in the dynamics segments (i.e. the new prescription, switch and supplementary markets). This ability reflects the impact of market and marketing influences and forecasts changes in future sales on the repeat prescription market. Information about the dynamic market shares of all brands of drugs on the market, and overall market performance, are summarised by the above-mentioned capture rate.

It can be noted that the term capture rate provides a measure of the drug's present market performance. Due to the connection between what is going on in the dynamic markets and repeat prescriptions, an estimation of future sales (i.e. mostly repeat prescription sales) of the product in question can be provided.

A further key success factor relates to the rationales for brand choice, i.e. the reasons behind the choice of the physicians for selecting a particular brand of a drug. It is believed that success in the market can be obtained via the rationale for choosing a particular drug, i.e. the "why", "when", "to whom" and "how" of prescribing the drug. Reasons for prescriptions can be presented as verbatims and the actual market entries as market shares on the "dynamic" market segments—the new prescription market 2, the switch market 3 and the supplementary market 4.

Figure 2:
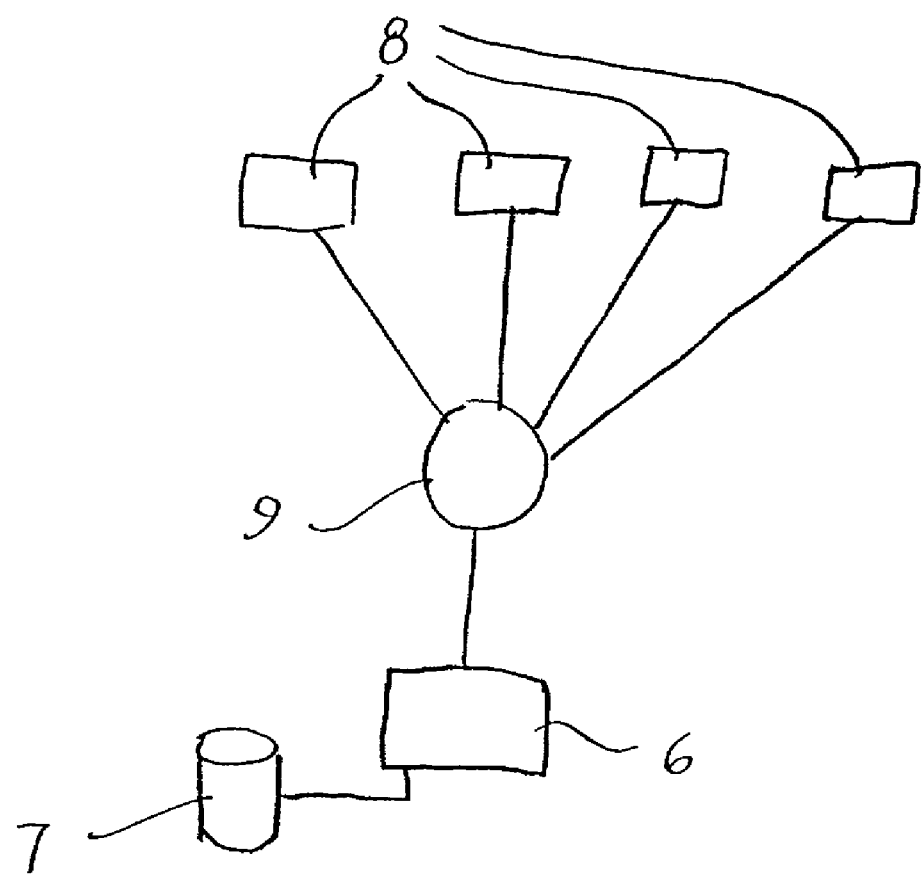
FIG. 2 shows in a simplified form a basic computer-based system to be used in accordance with the invention.

FIG. 2 indicates in a simplified and schematic manner a basic computer-based system by means of which the invention can be carried out. Said system comprises a central computer unit 6 which can be of general-purpose type, provided with a central processsing unit, a memory unit, a display screen, a keyboard, a communication unit etc.

The central computer unit 6 is associated with a database 7 adapted for storing data related to the various key success factors which have been described above. The computer unit 6 is also adapted for communicating with a plurality of external computers 8 via a suitable computer network 9, such as the Internet. It is obvious that the number of external computers 8 can be very large. In this regard, each external computer 8 is associated with an external client or user who is given authority to acces the information in the database 7. According to what is known as such, any one of the external computers 8 can be arranged so as to communicate with the central computer unit 6 if an appropriate user identification code and password are entered and transmitted to the central computer 6.

As mentioned, the plurality of external computers 8 correspond to various clients or users which are cooperating with a service provider which is associated with and responsible for the central computer unit 6 with its database 7. The client can be expected to be interested in acquiring information related to the market performance or the expected future sales of their own products (or their competitors' products). This will be now described in detail below. In particular, the invention will be described in detail in terms of how information related the various key success factors is collected, stored, processed and presented. Also, information regarding the propensity of the physicians to prescribe the new drug instead of current drugs is taken into account, as well as information regarding the market potential due to the unmet needs of the market, as explained above.

Data is gathered both by asking chosen physicians from a target group, and by monitoring their drug prescription and purchase patterns. For example, by conducting interviews with physicians, the detailing rate can be established.

Furthermore, the adoption of a drug can be graphically illustrated as a linear process which starts with the brand being a considered alternative in a physician's choice process and which ends with it becoming a "drug of choice", or a first rated drug for a particular disease.

Figure 3:
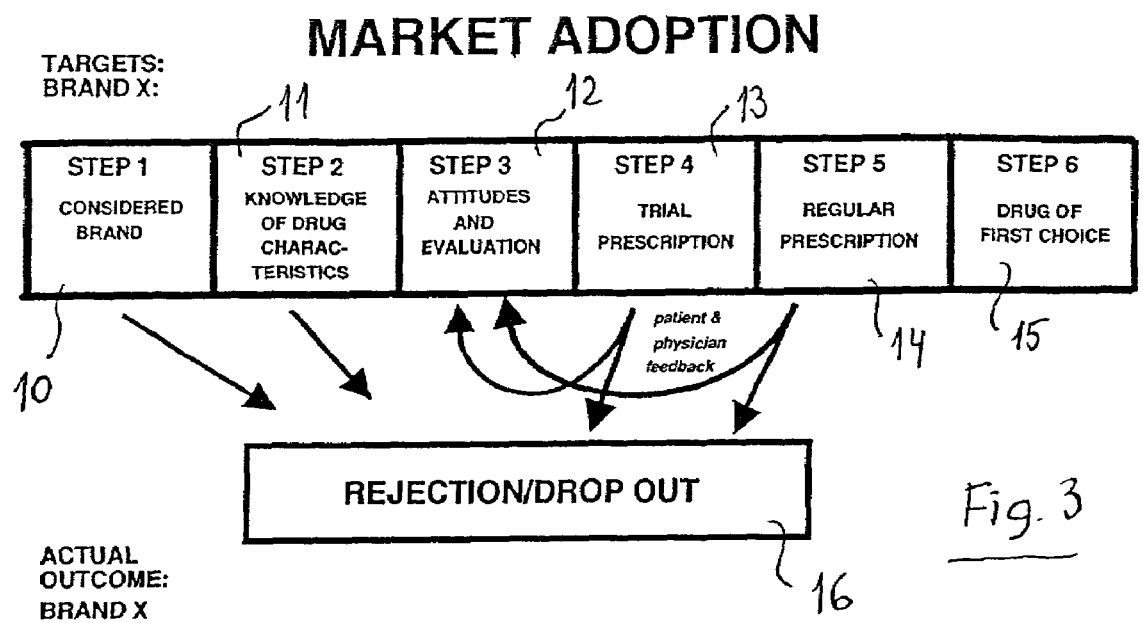
FIG. 3 shows schematically the adoption process related to a particular drug.

With reference to FIG. 3, the first step, indicated by means of reference numeral 10, of the adoption process is the "considered brand" step, which refers to a physician's spontaneous association of a particular drug to a specific indication (thus being one of his/her brand choice alternatives in the treatment decision making process). The proportion of physicians who considers the brand is above all the result of quantitative marketing measures.

The second step 11 of the adoption process is the "knowledge of drug characteristics" step and the third step is the "attitudes and evaluation" step 12. In these steps, the physician has become familiar with, believes in and has a need for the qualities presented in the product concept on which the drug is based. This is mainly achieved through qualitative marketing efforts. Negative attitudes may result in the physician rejecting the drug during these steps.

If the information about the drug and its qualities makes a positive impression upon the physician, it results in the fourth step, so so-called "trial prescription" step 13. In this step, the physician evaluates the drug, either objectively or subjectively. A positive assessment leads to new trials and a gradual transition to the fifth step, which is the "regular prescriptions" step 14, and the sixth step, the "drug of first choice" step 15. This sixth and final stage thus represents a situation in which the physicians feels confident about the drug in question and uses it as a first choice for treating the corresponding illnes. Negative results or assessments during these last steps may prevent successful adoption of the brand or may result in market rejection, or "drop out" 16.

During determination of the adoption rate, certain information is collected from a sample of decision-makers. For example, it is established which brands of drugs have been considered in decision situations by physicians. In this regard, information regarding the latest 6 months may for example be used. Also, it is established which drugs are perceived to be tried and/or regularly used. Furthermore, it is established which particular brand of a drug which is assessed to be the drug of first choice for a physician.

Figure 4:
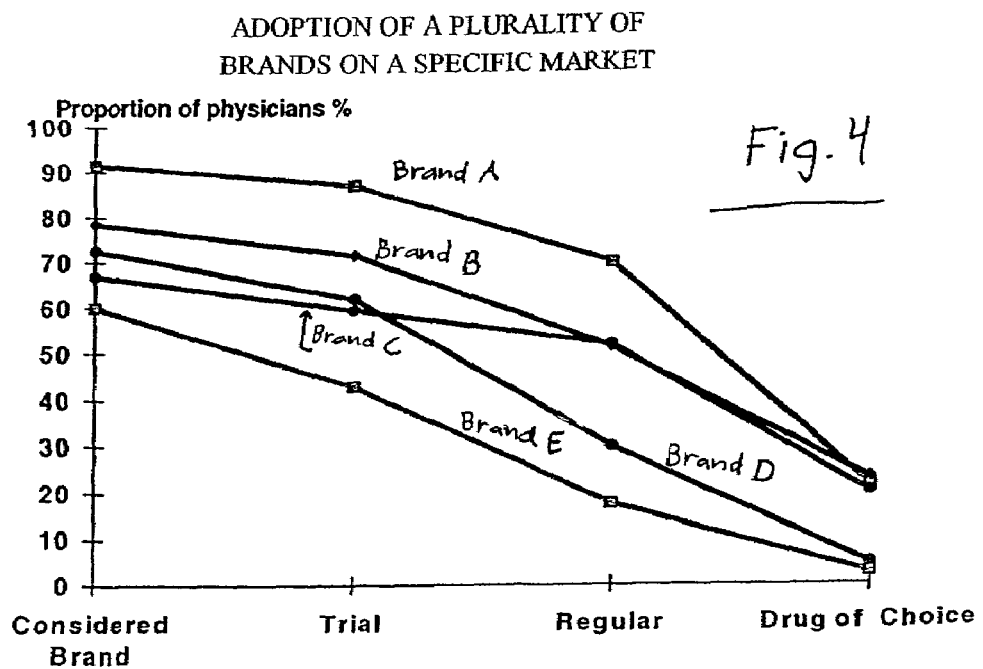
FIG. 4 is a diagram which shows schematically the actual adoption rates of a plurality of brands, FIG. 5 indicates in a schematical manner various parameters which affect the implementation of the present invention, and FIG. 6 indicates in a schematical manner how the future, post-launch success can be calculated by means of the invention.

FIG. 4 shows a diagram of the proportion of physicians from a particular test group adopting a particular brand, during consequtive steps during the above-mentioned adoption process.

According to what is shown in FIG. 4, it can be noted that the adoption rate summarises the proportion of physicians adopting a brand at different levels in the adoption process—considered brand, trial, regular prescription, and drug of first choice. Thus it provides a method by which the market adoption of the different brands can be quickly and easily compared.

The adoption for each drug is summarized as an adoption rate, preferably by way of the following algorithm:

(¼×the proportion of decision-makers considering the drug)+(½×the proportion of decision-makers having trial prescribed the drug)+(¾×the proportion of decision-makers regularly using the drug)+(1×the proportion of physicians having the drug as drug of choice)

The various weight factors can be chosen in any manner which is suitable for the type of product or service in which the invention is used.

Finally, the information as regards the adoption process is stored in the computer etc.

With reference to the schematical market description according to FIG. 1, it can be noted that distribution of the latest decisions regarding, for example the "switch" or "repeat" markets are used as an estimation of the relative size (or importance) of different submarkets. A data program is then used to draw a graph corresponding to the pyramid shaped figure according to FIG. 1, which consequently illustrates the relative size of submarkets. The data program also calculates the number of patients per average decision maker by combining data about the total number of patients per month and the relative size of the submarkets.

Information about brand choices in each of the submarkets is collected from a random sample of decision-makers. For new and switch decisions information is also gathered as the reasons for those choices.

As regards the capture rate, as discussed above, it can be noted that data from a random sample of decision-makers as to the relative size of the submarkets, and the market shares of drugs on the new, switch and supplementary submarkets, is suitably estimated. This data is then summarized into "capture rate" levels for drug brands, substance classes and companies. The following algorithm is then preferably applied:

| | Segment size | Proportion of Prescriptions |
|---|---|---|
| Step 1: Figures from the market pyramid | | |
| New Prescriptions | 25% | New/SUN 25/50 = 0.5 |
| Switch | 15% | Swi/SUM 15/50 = 0.3 |
| Supplementary | 10% | Sup/SUM 10/50 = 0.2 |
| Sum of dynamic segments | 50% | |
| Step 2: Market shares on the market pyramid Drug A: | | |
| New Prescription (X) | 10% | |
| Switch (net) (Y) | 5% | |
| Supplementary (Z) | 20% | |
| Step 3: Capture Rate for drug A | | |

(X*New) + (Y*Swi) + (Z*Sup) = Capture Rate
e.g (10%*0.5) + (5%*0.3) + (10%*0.2) = 10.5

Figure 5:
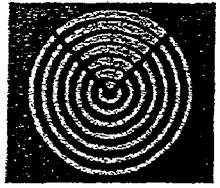
Figure 5:
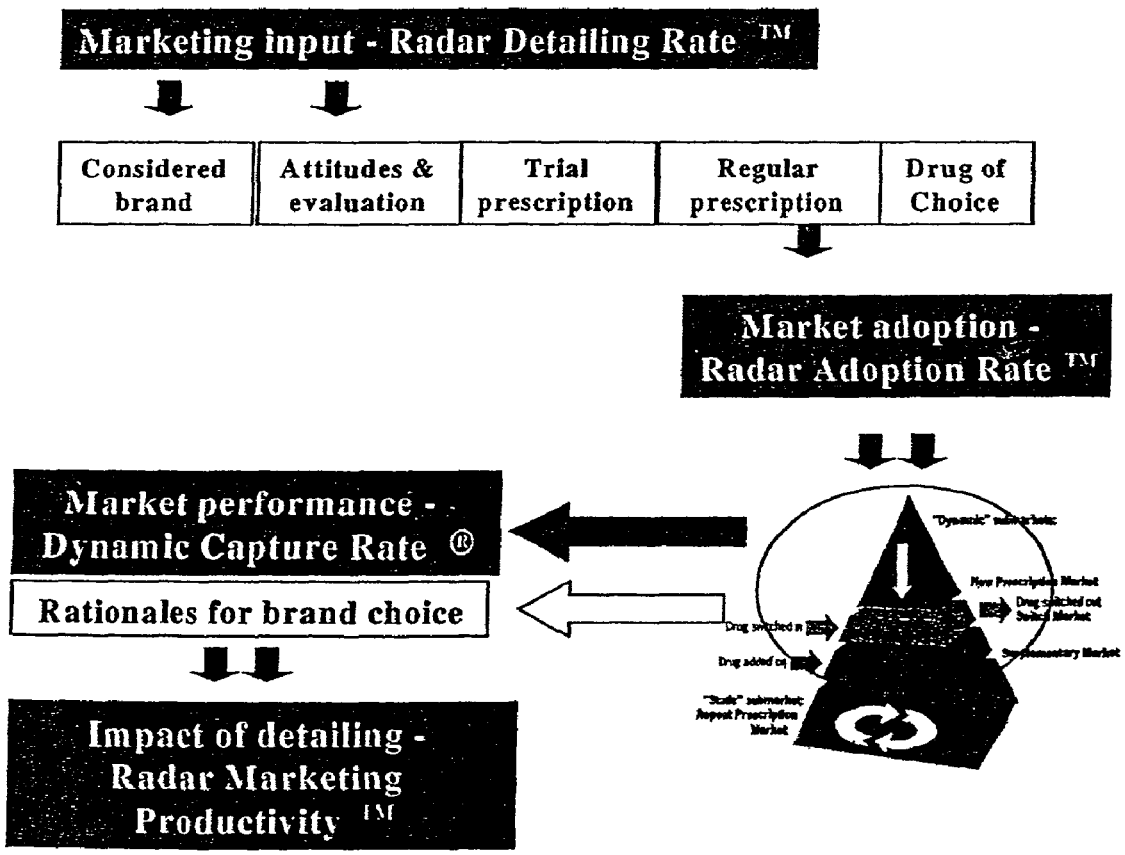

FIG. 5 indicates, in a schematical manner, the various parameters which affect the implementation of the present invention. As indicated, input data related to the market in question provides information regarding the "considered brand" step (see also FIG. 3). This information can be collected by carrying out interviews and surveys among physicians. Such information will also reflect the attitudes and the physicians' experience and evaluation of the particular drug. In this regard, it can be expected that the physician has become familiar with the drug in question.

If the marketing efforts and other influence on the physician have been sufficient and successful, the so-called "trial prescription" step will follow. After a positive assessment of the drug, the physician will use the drug for regular prescriptions. Ultimately, the drug will be the physician's "drug of choice".

As mentioned above, the so-called adoption rate summarises the proportion of physicians adopting a brand at the various stages in the adoption process (i.e. the "considered brand" stage, the "attitudes and evaluation" stage, the "trial prescription" stage, the "regular prescription" stage and the "drug of first choice" stage). Thus it provides a method by which the market adoption of different brands can be compared.

Furthermore, and as indicated in FIG. 5, the adoption rate for a particular product will affect the total market for this product. As mentioned above, this total market can be subdivided into dynamic and static market market segments. The dynamic market segments comprise the "new prescription market", the "switch market" and the "supplementary market". The static market segment corresponds to the "repeat prescription market". Since the aim of marketing is to increase the prescription rate of a drug, marketing needs to affect the ability of the drug in question to capture new patients in the dynamic market segments. As mentioned above, information about the dynamic market shares of different brands are summarised by the term capture rate. Consequently, the capture rate indicates the drug's present market performance. Due to the connection between the dynamic market segments and the repeat market, an estimation of future sales of the product can be provided in accordance with the invention.

Furthermore, as indicated in FIG. 6, the marketing productivity of a drug is defined as the marginal effect achieved by detailing in terms of the adoption and capture rate of an agent among physicians who have been detailed and those who have not been detailed during a given time period.

The above-mentioned key success factors can be used according to the present invention for a pre-launch quantification of post-launch market performance. In particular, said quantification is then constituted by market information which for example includes data about the number of patients which enter the system per month and per physician. Also the decision structure, i.e. the type and frequency of treatment decisions, can be estimated.

For example, the capture rate provides information about the dynamic market shares and can be used as a measure of the present market performance of the drug.

Furthermore, by means of the invention, the current unmet market needs with current drugs for the particular illness will be established. The unmet needs are identified and quantified in terms of the proportion of physicians for which these unmet needs are relevant. For this reason, the perceived problems related to current, competing drugs must first be determined. For this reason, interviews are held with a number of physicians who then may state any problems and unmet needs of existing drugs for the illness in question. The information related to the unmet needs must then be quantified in terms of the proportion of physicians for which they are relevant. If a certain number of physicians (for example 50%) is of the opinion that a particular drug has a particular disadvantage, this means that the "potential" of the drug can be quantified by a number (0.5 in this case) which corresponds to this proportion of physicians. This means that there is a potential for the new drug to capture market shares corresponding to the magnitude of the potential.

Furthermore, it should be noted that the unmet needs can be in the form of salient needs, i.e. spontaneously expressed problems with current drugs, or in the form of latent needs, i.e. problems derived by the physicians reacting affirmatively or not, in part or in full, to an issues being a very large problem with current drugs.

In summary, the fact that a certain proportion of the physicians can identify one or more unmet needs is used in the present invention to provide numerical information related to a market potential for the new drug.

Furthermore, according to the invention it is also necessary to determine whether the new drug will trigger a sufficiently high level of acceptance in terms of the propensity of the physicians to prescribe the new drug instead of current drugs in defined treatment situations. In this regard, the propensity to prescribe a particular drug as an alternative to other existing drugs should be quantified by a number, say 0.5 or 50%, which corresponds to the proportion of the interviewed physicians who would prefer the drug in question instead of a relevant competing drug. The value corresponding to said propensity could then be multiplied by the proportion of a physician's patients which currently uses the competing drug and to which the new drug can be prescribed.

A quantification of the future, i.e. post-launch, performance on the market of the drug can then be estimated based on three types of information:

i) market information including, for example, data about the number of patients which enter the system per month and per physician, ii) information related to the unmet needs on the market, quantified in terms of the proportion of physicians for which such unmet needs are relevant, and iii) information related to the propensity to prescribe a particular drug, quantified in terms of the proportion of physicians who would prefer the drug instead of competing drugs.

The calculation of the post-launch performance will now be described with reference to FIG. 6, which indicates in a schematical manner which parameters are taken into account when the quantification of the post-launch performance is carried out. It should be noted that the three lines of boxes shown schematically in FIG. 6 correspond to three different market segments, preferably the "new prescription" market, the "switch" market and the "supplementary" market, respectively. With reference to the top line in FIG. 6 (corresponding to the "new prescription" market) it should be noted that a numerical value indicating the propensity of a physician (see reference numeral 17 in FIG. 6) to prescribe the new drug in question is multiplied with the proportion of the physician's patients (reference numberal 18) which currently uses a relevant competing drug and to which the new drug can be prescribed. The resulting value is multiplied with a value (19) representing the market potential, i.e. the unmet needs of existing, competing drugs in the "new prescription" market. This value is determined as corresponding to the proportion of physicians who is of the opinion that relevant unmet needs related to competing drugs exist in the relevant market. This resulting value is then multiplied with a number representing the market segment size (20), i.e. the "new prescription" market in this case. The resulting number is multiplied with a number (21) representing the market shares (on the "new prescription" market) of the relevant competing products. Finally, this resulting number is multiplied with a value (22) representing the number of patients (for a given time period, for example, per week or per month) entering the market. This final, resulting value (reference numeral 23) will represent the total number of patients which can be expected to be "captured" by the drug in question for a given time period and for a particular physician, in the "new prescription" market.

Corresponding calculations are made for the "switch" market and the supplementary market, which is schematically indicated in the second and third lines of FIG. 6. A resulting value (reference numeral 24) will represent the total number of patients which can be expected to be captured in the "switch" market, whereas another resulting value (reference numeral 25) will represent the total number of patients which can be expected to be captured in the "supplementary" market. A total, resulting value (reference numeral 26) of the total number of patients which will be expected to be captured on all dynamic markets will be calculated as the sum of the three above-mentioned resulting values (23, 24, 25).

The invention relies on the fact that information is collected from a sample of decision-makers. The information is processed and reduced into the above-mentioned key success factors, making the present market performance transparent and allowing for the prediction of future sales. In addition to information related to the key success factors, the invention also relies on information related to the potential (i.e. the unmet needs) of a market, and information related to the propensity to prescribe a drug.

When quantifying the future, post-launch, performance of the drug, the above-mentioned market information is consequently used to determine the available market in terms of the number of patients (per month, for example) which can be "captured", i.e. which are available in the dynamic market segments. This number is multiplied with corresponding numbers indicating the "potential" and "propensity", as described above. This will result in a number which indicates the number of patients which can be expected to be "captured" by means of the new drug after its launch.

Furthermore, according to another embodiment of the invention, the estimated value of the capture rate of a drug can be compared with a calculated value of the capture of a competing, existing drug. If, for example, the capture rate of the new drug is approximately equal to the capture rate of the existing drug, it can be assumed that the future sales of the new drug will be equal to the sales of the existing drug.

A client may obtain the finished result, i.e. the information regarding the marketing parameters described above, in various ways. For example, the results can be obtained by the client via a connection to the service provider's web page, by means of a password giving access to the information in question. This has been described above with reference to FIG. 2. In this manner, each client can select their own sets of information related to the drugs of interest. By connecting to the database 7 (see FIG. 2), the client may consequently select and use the set of information which is of interest, for providing tables, graphs etc. Alternatively, the result can be delivered to the client on a suitable computer-readable data carrier, for example a diskette or a CD-ROM disc, which then contains the information selected by the user and processed according to the invention. The information can also be supplied via e-mail as a data file. Also, the result can be presented in the form of a printed publication.

In particular, the invention can be used in a manner in which a client may simulate the expected post-launch performance resulting from a number of choices. This means that by focusing on different latent needs for a particular drug (for example a "too high price level", or "a too slow onset of action", or "too many side effects"), different values as regards the expected number of captured patients will be obtained depending on which latent need is emphasized. This also means that the propensity of a physician to prescribe the drug in question as an alternative to an existing drug will vary depending on which latent need is "chosen". According to the invention, a user may select between a number of choices as regards for example different latent needs, or different target groups in the form of categories of physicians (general practitioners or specialists), or different market segments, and may then be able to obtain information as regards the resulting numbers of captured patients which will be obtained as a result of the choices made. This type of "simulated" market studies are made possible by means of the invention, in particular for presenting results of strategic, pre-launch choices via the service provider's web page. In this manner, the user may determine which combination of decisions will render the highest number of patients for the product and consequently also the highest impact on the relevant markets.

The client can be a medicine manufacturer, a research center or even an advertising agency, who then may use the principles according to the invention in order to gain access to valuable marketing information. In particular, the information which can be provided by means of the invention can be used for benchmarking of various products, for example on different markets or during specific time periods.

The invention is not limited to the embodiments described above but may be varied within the scope of the appended patent claims. In particular, it should be noted that the invention is not limited for applying to marketing and selling medical drugs. The invention can be equally well used in other fields of trade, and other types of products (for example cars) and services (for example bank services). one user via a network such as an internet.

The invention claimed is:

1. A method for determining the post-launch performance of a product on a market, comprising:
   storing, in a database, collected first data related to at least one key success factor associated with at least a market performance which is related to said product;
   storing, in a database, collected second data related to unmet product needs on said market;
   storing, in a database, collected third data related to a propensity of a decision-maker to choose said product;
   linking a computer to said databases; and
   using a simulation model on said computer to calculate a future market share of said product based on said collected first, second, and third data, thereby determining said post-launch performance on said market.

2. A method according to claim 1, wherein said calculating comprises multiplying a numerical value representing the collected data related to said unmet needs with a numerical value representing the collected data related to said propensity and with a numerical value representing the an existing market share of at least one further, competing, product.

3. A method according to claim 1 or 2, wherein said collected data and a results of said calculating is made available for transmission to at least one user via a network such as an internet.

\* \* \* \* \*